(12) United States Patent
Hirano

(10) Patent No.: US 11,953,103 B2
(45) Date of Patent: Apr. 9, 2024

(54) MANUFACTURING METHOD FOR OIL PRESSURE CONTROL VALVE

(71) Applicant: DENSO CORPORATION, Kariya (JP)

(72) Inventor: Akinori Hirano, Kariya (JP)

(73) Assignee: DENSO CORPORATION, Kariya (JP)

( * ) Notice: Subject to any disclaimer, the term of this patent is extended or adjusted under 35 U.S.C. 154(b) by 127 days.

(21) Appl. No.: 17/840,710

(22) Filed: Jun. 15, 2022

(65) Prior Publication Data

US 2022/0307615 A1    Sep. 29, 2022

Related U.S. Application Data

(63) Continuation of application No. PCT/JP2020/046504, filed on Dec. 14, 2020.

(30) Foreign Application Priority Data

Dec. 20, 2019  (JP) .................................. 2019-230180

(51) Int. Cl.
F16K 11/07   (2006.01)
F16K 31/06   (2006.01)

(52) U.S. Cl.
CPC ...... F16K 11/0708 (2013.01); F16K 31/0613 (2013.01)

(58) Field of Classification Search
CPC .. F16K 11/07; F16K 11/0708; F16K 31/0613; F16K 11/06; F16K 11/065; F16F 1/12; F16F 1/121; F16F 1/125
See application file for complete search history.

(56) References Cited

U.S. PATENT DOCUMENTS

| 9,683,657 | B2* | 6/2017 | Hara | F16H 61/0251 |
| 9,863,541 | B2* | 1/2018 | Hirano | B21K 25/00 |
| 2013/0161550 | A1* | 6/2013 | Hirano | F16K 11/07 251/285 |
| 2015/0129072 | A1* | 5/2015 | Hara | F16K 31/0613 29/896.9 |
| 2015/0247585 | A1* | 9/2015 | Takanishi | F16K 31/0613 251/129.02 |
| 2020/0080653 | A1* | 3/2020 | Ueno | F16K 11/0708 |

FOREIGN PATENT DOCUMENTS

JP    2015-161386    9/2015

* cited by examiner

Primary Examiner — Kelsey E Cary
(74) Attorney, Agent, or Firm — Nixon & Vanderhye P.C.

(57) ABSTRACT

At a preparing stage, a tool is placed in contact with an inner wall of a rotation transmitting portion of an adjustment screw. Then, at an adjustment rotation amount calculating stage, a pre-adjustment oil pressure, which is an output oil pressure of an oil pressure control valve at a pre-adjustment rotational position of the adjustment screw under a predetermined drive condition of a drive device, is sensed, and thereafter an adjustment rotation amount of the adjustment screw from the pre-adjustment rotational position to a target rotational position of the adjustment screw, which corresponds to a target oil pressure, is calculated based on: a differential pressure between the pre-adjustment oil pressure and the target oil pressure; and a correction amount which corresponds to a product characteristic of the oil pressure control valve. Then, at a rotating stage, the adjustment screw is rotated by the adjustment rotation amount.

6 Claims, 12 Drawing Sheets

MANUFACTURING METHOD FOR OIL PRESSURE CONTROL VALVE

CROSS REFERENCE TO RELATED APPLICATIONS

This application is a continuation application of International Patent Application No. PCT/JP2020/046504 filed on Dec. 14, 2020, which designated the U.S. and claims the benefit of priority from Japanese Patent Application No. 2019-230180 filed on Dec. 20, 2019. The entire disclosures of all of the above applications are incorporated herein by reference.

TECHNICAL FIELD

The present disclosure relates to a manufacturing method for an oil pressure control valve.

BACKGROUND

Previously, there has been proposed an oil pressure control valve that is configured to change an output oil pressure of the oil pressure control valve by opening or closing a corresponding one or more of oil ports through reciprocation of a spool in a sleeve. Furthermore, there has been proposed a structure that adjusts a load of a spring, which urges the spool against a drive force for driving the spool, through rotation of an adjustment screw to adjust the output oil pressure to a target oil pressure at the time of manufacturing the oil pressure control valve. For example, in a previously proposed manufacturing method of the oil pressure control valve, the sleeve is locally deformed to fix a position of the adjustment screw relative to the sleeve after adjusting the spring load.

SUMMARY

This section provides a general summary of the disclosure, and is not a comprehensive disclosure of its full scope or all of its features.

According to the present disclosure, there is provided a manufacturing method for an oil pressure control valve, including:
- a pressure adjusting step that includes rotating an adjustment screw by a pressure adjusting device and thereby adjusting a set load of a spring, which is configured to urge a spool in a direction away from a female threaded portion of the sleeve against a drive force of a drive device, to adjust an output oil pressure of the oil pressure control valve, which is generated under a predetermined drive condition of the drive device, to a target oil pressure, wherein the pressure adjusting step includes:
  - a preparing stage that includes placing a tool in contact with an inner wall of a rotation transmitting portion of the adjustment screw by the pressure adjusting device without forming a gap between the tool and the rotation transmitting portion at least in a rotational direction of the tool;
  - an adjustment rotation amount calculating stage that includes:
    - sensing a pre-adjustment oil pressure, which is the output oil pressure at a pre-adjustment rotational position of the adjustment screw under the predetermined drive condition, by the pressure adjusting device after the preparing stage; and
    - thereafter calculating an adjustment rotation amount of the adjustment screw by the pressure adjusting device from the pre-adjustment rotational position of the adjustment screw to a target rotational position of the adjustment screw, which corresponds to the target oil pressure, based on:
      - a differential pressure between the pre-adjustment oil pressure and the target oil pressure; and
      - a correction amount which corresponds to a product characteristic of the oil pressure control valve; and
  - a rotating stage that includes rotating the adjustment screw by the adjustment rotation amount by the pressure adjusting device.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
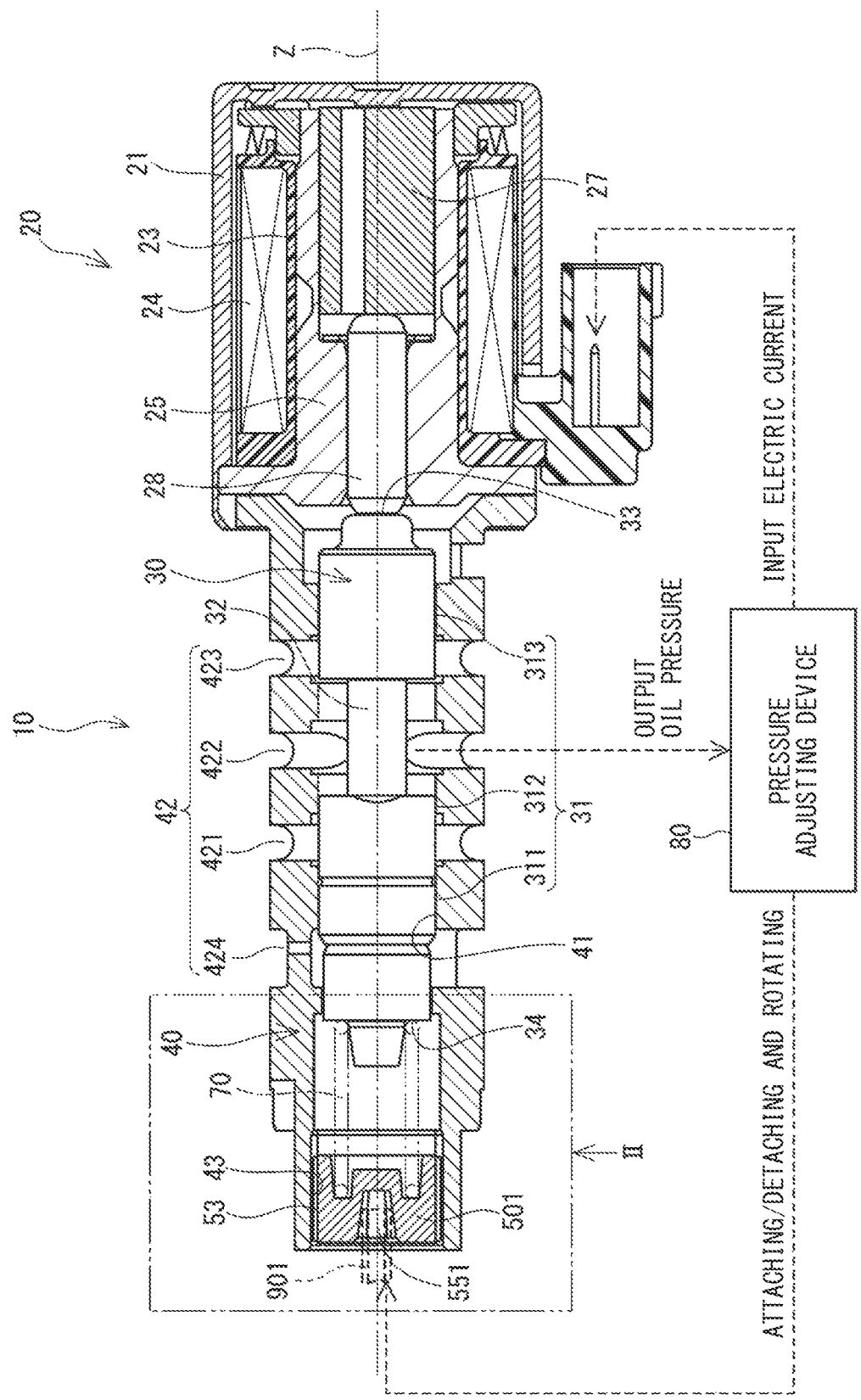
FIG. 1 is an axial cross-sectional view showing an overall structure of an oil pressure control valve.

Previously, there has been proposed an oil pressure control valve that is configured to change an output oil pressure of the oil pressure control valve by opening or closing a corresponding one or more of oil ports through reciprocation of a spool in a sleeve. Furthermore, there has been proposed a structure that adjusts a load of a spring, which urges the spool against a drive force for driving the spool, through rotation of an adjustment screw to adjust the output oil pressure to a target oil pressure at the time of manufacturing the oil pressure control valve. For example, in a previously proposed manufacturing method of the oil pressure control valve, the sleeve is locally deformed to fix a position of the adjustment screw relative to the sleeve after adjusting the spring load.

In the previously proposed adjusting method for the oil pressure control valve, the output oil pressure is monitored, and at the same time, the adjustment screw is rotated until the output oil pressure reaches a desired oil pressure. For example, in a structure where the spool is driven by an electromagnetic force of a solenoid, the output oil pressure P is monitored in a state where an adjusting electric current I is applied to the solenoid, and at the same time, the adjustment screw is rotated until the desired output oil pressure is achieved to balance with the spring load. Thereafter, the adjustment screw is fixed to the sleeve by, for example, locally plastically deforming the sleeve, and thereby the characteristic of the output oil pressure P relative to the adjusting electric current I becomes a desired I-P characteristic.

In the above-described pressure adjusting method, the output oil pressure P, which is monitored during the adjustment, needs to coincide with an oil pressure value at the time of measuring the desired I-P characteristic while supplying the adjusting electric current I. However, in reality, a frictional force is generated between the spool and the sleeve in the middle of moving the spool to a desired position by rotating the adjustment screw while supplying the adjusting electric current I. Therefore, the spring load needs to be changed by adding a load that overcomes the frictional force generated at the spool during the movement of the spool. Thus, the adjustment accuracy of the output oil pressure may possibly be deteriorated due to the variation in the frictional force, the variation in the adjustment oil pressure amount among the individual products, i.e., the variation in the adjustment screw rotation amount among the individual products and/or the variation in the pre-adjustment oil pressure value among the individual products.

In the fixing method of the adjustment screw where the sleeve is locally plastically deformed to fix the sleeve, a backlash (also referred to as a play) in the axial direction between the female thread of the sleeve and the male thread of the adjustment screw may possibly cause an adjustment error. Therefore, it is necessary to limit the generation of the adjustment error caused by the backlash through minimization of the amount of the backlash or application of an axial load to the adjustment screw relative to the sleeve. However, if the adjustment is made while applying the axial load to the adjustment screw, foreign objects (debris) may possibly be generated due to the friction between the male thread and the female thread.

An oil pressure control valve manufactured by the manufacturing method of the present disclosure includes a sleeve shaped in a tubular form, a spool, a drive device, a spring and an adjustment screw. The sleeve has a plurality of oil ports, each of which radially communicates between an inside and an outside of the sleeve, and a female threaded portion is formed at one end portion of the sleeve.

The spool is received in the sleeve and is configured to slide along an inner wall of the sleeve. The spool opens or closes a corresponding one or more of the plurality of oil ports depending on an axial position of the spool to change an output oil pressure of the oil pressure control valve. The drive device is configured to generate a drive force for moving the spool toward the female threaded portion. For example, the drive device generates an electromagnetic force as the drive force by supplying an electric current to a coil. The spring is configured to urge the spool in a direction away from the female threaded portion against the drive force.

The adjustment screw includes: a male threaded portion that is threadably engaged with the female threaded portion of the sleeve; and a rotation transmitting portion that is a hole which opens at an end surface of the adjustment screw and has a radial cross-section shaped in a non-circular form such that a tool, which has a radial cross-section shaped in a form that corresponds to the non-circular form of the radial cross-section of the rotation transmitting portion, is insertable into the rotation transmitting portion. The adjustment screw is configured to adjust a set load of the spring when the adjustment screw is rotated integrally with the tool inserted into the rotation transmitting portion to change a position of the adjustment screw in an axial direction according to a rotation amount of the adjustment screw.

The manufacturing method of the oil pressure control valve includes a pressure adjusting step that includes rotating the adjustment screw by a pressure adjusting device and thereby adjusting the set load of the spring to adjust the output oil pressure of the oil pressure control valve, which is generated under a predetermined drive condition of the drive device, to a target oil pressure. The pressure adjusting step includes a preparing stage, an adjustment rotation amount calculating stage and a rotating stage. At the preparing stage, the tool is placed in contact with an inner wall of the rotation transmitting portion by the pressure adjusting device without forming a gap between the tool and the rotation transmitting portion at least in a rotational direction of the tool.

At an adjustment rotation amount calculating stage after the preparing stage, the pressure adjusting device senses a pre-adjustment oil pressure, which is the output oil pressure at a pre-adjustment rotational position of the adjustment screw under the predetermined drive condition. Thereafter, the pressure adjusting device calculates an adjustment rotation amount of the adjustment screw from the pre-adjustment rotational position of the adjustment screw to a target rotational position of the adjustment screw, which corresponds to the target oil pressure, based on: a differential pressure between the pre-adjustment oil pressure and the target oil pressure; and a correction amount which corresponds to a product characteristic of the oil pressure control valve. In a case where the drive device is a drive device that generates an electromagnetic force, the product characteristic, which is reflected in the correction amount, is, for example, a magnetic attractive force characteristic (or an electric current to solenoid generating load characteristic), and/or a spool position to output oil pressure characteristic. At the rotating stage, the pressure adjusting device rotates the adjustment screw by the adjustment rotation amount.

In the previously proposed pressure adjusting method, an error (hereinafter referred to as a pressure adjustment error) is generated due to a change in a frictional force applied to the spool during the time of adjusting the pressure while the change in the frictional force applied to the spool is induced by a variation in the output oil pressure state before the adjustment and/or a variation among the individual products, i.e., a product-to-product variation. According to the present disclosure, in view of the above point, the adjustment rotation amount is calculated in advance based on: the differential pressure between the pre-adjustment oil pressure and the target oil pressure; and the correction amount, which corresponds to the product characteristic. By such feed-forward pressure adjustment, the output oil pressure can be adjusted with high accuracy without being affected by the variation in the frictional force applied to the spool. Furthermore, according to the present disclosure, since it is not required to apply the load to the adjustment screw in the axial direction while rotating the adjustment screw, it is possible to limit the generation of a foreign object caused by the friction between the threaded portions.

Furthermore, as a structure for placing the tool in contact with the rotation transmitting portion without forming a gap therebetween at the preparing stage of the present disclosure, it is preferred that the inner wall of the rotation transmitting portion of the adjustment screw is sloped to progressively approach the rotational axis from the opening side toward the bottom side of the rotation transmitting portion. At the preparing stage, the tool is inserted to a depth, at which an outer periphery of the distal end of the tool contacts the inner wall of the rotation transmitting portion. Therefore, accuracy of the adjustment rotation amount is ensured.

Hereinafter, embodiments of a manufacturing method for an oil pressure control valve will be described with reference to the drawings. In the following embodiments, substantially identical components will be indicated by the same reference signs and will not be redundantly described for the sake of simplicity. Furthermore, the first to fourth embodiments may be collectively referred to as the present embodiment. The oil pressure control valve manufactured by each of the embodiments is applied to, for example, an oil pressure system (also referred to as a hydraulic system) of an automatic transmission.

(Overall Structure of Oil Pressure Control Valve)

First of all, an overall structure of the oil pressure control valve 10 will be described with reference to FIGS. 1 and 2. Shapes of an adjustment screw 501, a rotation transmitting portion 551 and a tool 901 of the first embodiment are indicated in the drawings, and reference signs of the adjustment screw 501, the rotation transmitting portion 551 and the tool 901 are used to describe these in the specification. The tool 901, which is an external element of the oil pressure control valve 10, is indicated by a dotted line in the drawings. The oil pressure control valve 10 includes a sleeve 40 shaped in a tubular form, a spool 30, a drive device 20, a spring 70 and the adjustment screw 501.

The sleeve 40, the spool 30, the drive device 20, the spring 70 and the adjustment screw 501 are arranged to be coaxial with a common central axis Z. Hereinafter, an axial direction of the central axis Z will be simply referred to as an axial direction, and a direction, which is perpendicular to the axial direction, will be referred to as a radial direction. In particular, when focusing on the adjustment screw 501, the central axis Z is also referred to as a rotational axis Z since the adjustment screw 501 is rotated about the central axis Z. Furthermore, for the sake of convenience, a side of FIG. 1, at which the adjustment screw 501 is placed, will be referred to as a front side, and an opposite side, at which the drive device 20 is placed, will be referred to as a rear side.

The sleeve 40 is shaped generally in a cylindrical tubular form and is made of a metal material. The sleeve 40 has a plurality of oil ports 42, each of which radially communicates between an inside and an outside of the sleeve 40. For example, the oil ports 42 include an inlet port 421, an outlet port 422, a discharge port 423 and a feedback port 424. A function of each of these oil ports is well known in the art and will not be described for the sake of simplicity. Furthermore, the sleeve 40 has a female threaded portion 43 which is formed at one end portion of the sleeve 40 that is opposite to the drive device 20 to threadably engage with a male threaded portion 53 of the adjustment screw 501.

The spool 30 is received in the sleeve 40 such that the spool 30 is slidable along an inner wall 41 of the sleeve 40. A plurality of lands 31, which are opposed to the inner wall 41 of the sleeve 40, are formed at an outer peripheral surface of the spool 30. The lands 31 include a land 311, a land 312 and a land 313 which are arranged in this order from the adjustment screw 501 side toward the drive device 20 side, and a small diameter portion 32 is formed between the land 312 and the land 313 at the spool 30. A rear end portion 33 of the spool 30, which is located on the drive device 20 side, contacts a distal end of a shaft 28. A spring seat 34 is formed at a front end of the spool 30, which is located on the side opposite to the rear end portion 33, to support a rear end portion of the spring 70. The spool 30 is moved at the inside of the sleeve 40 and opens or closes a corresponding one or more of the oil ports 42 depending on the axial position of the spool 30 to change the output oil pressure.

The drive device 20 is configured to generate a drive force for moving the spool 30 toward the female threaded portion 43. The drive device 20 of the present embodiment includes a solenoid that is configured to generate an electromagnetic force as the drive force through supply of an electric current to a coil 24. A drive condition of the drive device 20 is set by an input electric current that is supplied to the coil 24.

The drive device 20 includes a case 21, the coil 24, a core 25, the plunger 27 and a shaft 28. The coil 24 is formed by winding a conductive wire, which is coated with a dielectric film, around a bobbin 23 made of resin. The case 21, the core 25 and the plunger 27 are made of a magnetic material. When the electric current is supplied to the coil 24, a magnetic flux flows in a magnetic circuit that passes through the case 21, the core 25 and the plunger 27. The plunger 27 is magnetically attracted to the core 25 according to the amount of electric current supplied to the coil 24. When the plunger 27 is driven by the magnetic attractive force of the core 25, the drive force of the plunger 27 is transmitted to the rear end portion 33 of the spool 30 through the shaft 28. Therefore, the spool 30 is moved in response to the operation of the plunger 27.

The spring 70 is supported between the spring seat 34 of the spool 30 and a spring seat 52 of the adjustment screw 501 and urges the spool 30 in a direction away from the female threaded portion 43 against the drive force of the drive device 20. When the drive force becomes larger than an urging force of the spring 70, the spool 30 is moved forward toward the female threaded portion 43 of the sleeve 40. In contrast, when the drive force becomes smaller than the urging force of the spring 70, the spool 30 is moved backward away from the female threaded portion 43 of the sleeve 40.

Here, the position of the spring seat 34 of the spool 30 relative to the amount of input electric current of the drive device 20 varies among the individual products, due to, for example, a variation in the electromagnetic force characteristic of the drive device 20 and/or a variation in a total length of the spool 30. Also, the load characteristic of the spring 70 varies among the individual products. Therefore, at the time of manufacturing the oil pressure control valve 10, a pressure adjusting step of adjusting the output oil pressure, which is generated under a predetermined drive condition of the drive device 20, to a target oil pressure needs to be performed for each individual product. For the oil pressure control valve 10 of the present embodiment, the pressure adjusting step is performed by adjusting a set load of the spring 70 through rotation of the adjustment screw 501 with the tool 901.

The adjustment screw 501 has the male threaded portion 53 which is formed at an outer peripheral portion of the adjustment screw 501 and is configured to be threadably engaged with the female threaded portion 43 of the sleeve 40. Furthermore, the adjustment screw 501 has the rotation transmitting portion 551 which is located along the rotational axis Z and is configured to receive the tool 901. The rotation transmitting portion 551 is a hole which opens at an end surface 51 of the adjustment screw 501 and has a radial cross-section shaped in a non-circular form such that the tool 901, which has a radial cross-section shaped in a form that corresponds to the non-circular form of the radial cross-section of the rotation transmitting portion 551, is insertable into the rotation transmitting portion 551. As described later, as a representative example, a hexagonal bit, which corresponds to a regular hexagonal hole, is used as the tool 901. Since it is obvious from the common general knowledge that the shape of the cross-section of the rotation transmitting portion 551 means the shape of the cross-section in the radial direction, the term "radial" may be omitted from "radial cross-section" in the specification.

The spring seat 52, which supports the front end portion of the spring 70, is formed at a portion of the adjustment screw 501 placed on the spool 30 side. The shape of each of the portions (including the spring seat 52 of the portion of the adjust screw 501 which placed on the spool 30 side), which guide the radial position of the spring 70, is not limited to the shape shown in the drawings and may be any shape. The adjustment screw 501 is rotated integrally with the tool 901, which is inserted into the rotation transmitting portion 551, such that the adjustment screw 501 is displaced, i.e., is moved in the axial direction according to the rotation amount of the adjustment screw 501 to adjust the set load of the spring 70.

Furthermore, as a device, which performs the pressure adjusting step of the present embodiment, it is necessary to have a device that has a function of supplying the electric current to the coil 24 of the drive device 20, a function of sensing the output oil pressure and a function of attaching and detaching the tool 901 relative to the rotation transmitting portion 551 and rotating the tool 901 by the commanded rotation amount. The device, which performs these functions, are indicated as a single pressure adjusting device 80 in FIG. 1. In reality, the pressure adjusting device 80 may be formed by a plurality of devices (including: for example, a drive unit with, for example, an electric motor(s) for axially moving and circumferentially rotating the tool 901; an oil pressure sensor for sensing the output oil pressure; and an electronic controller having a processor and a memory for controlling the drive unit and the drive device 20). Furthermore, the pressure adjusting device 80 is not necessarily a dedicated device and may include a portion of another device used in another step(s), such as an inspecting step.

Hereinafter, a mechanism, which adjusts the set load of the spring 70 by changing a depth of thread engagement between the male threaded portion 53 of the adjustment screw 501 and the female threaded portion 43 of the sleeve 40 through the rotation of the adjustment screw 501 with the tool 901, will be referred to as a screw adjustment mechanism. The structure of the screw adjustment mechanism will be described in detail in each of the following embodiments. Each of reference signs of the adjustment screw, the rotation transmitting portion and the tool in each embodiment are indicated by three digits while the number of the embodiment is indicated by a third digit following each of "50", "55", and "90". However, in a case where the component(s) has the same structure as that of the previously described embodiment, the same reference sign is used for this component(s).

In the first embodiment and the third embodiment, at least one of an inner wall of the rotation transmitting portion or an outer wall of the tool is sloped to ensure the required adjustment accuracy in the pressure adjusting step, so that the tool and the rotation transmitting portion contact with each other without forming a gap therebetween. In the second embodiment, a unique structure, which is suitable for a fixing step executed after the pressure adjusting step, is added relative to the first embodiment. In the fourth embodiment, the same effect as those of the previous embodiments is obtained only by the operation of the pressure adjusting device 80 without making the rotation transmitting portion or the tool into a special shape.

First Embodiment

Figure 2:
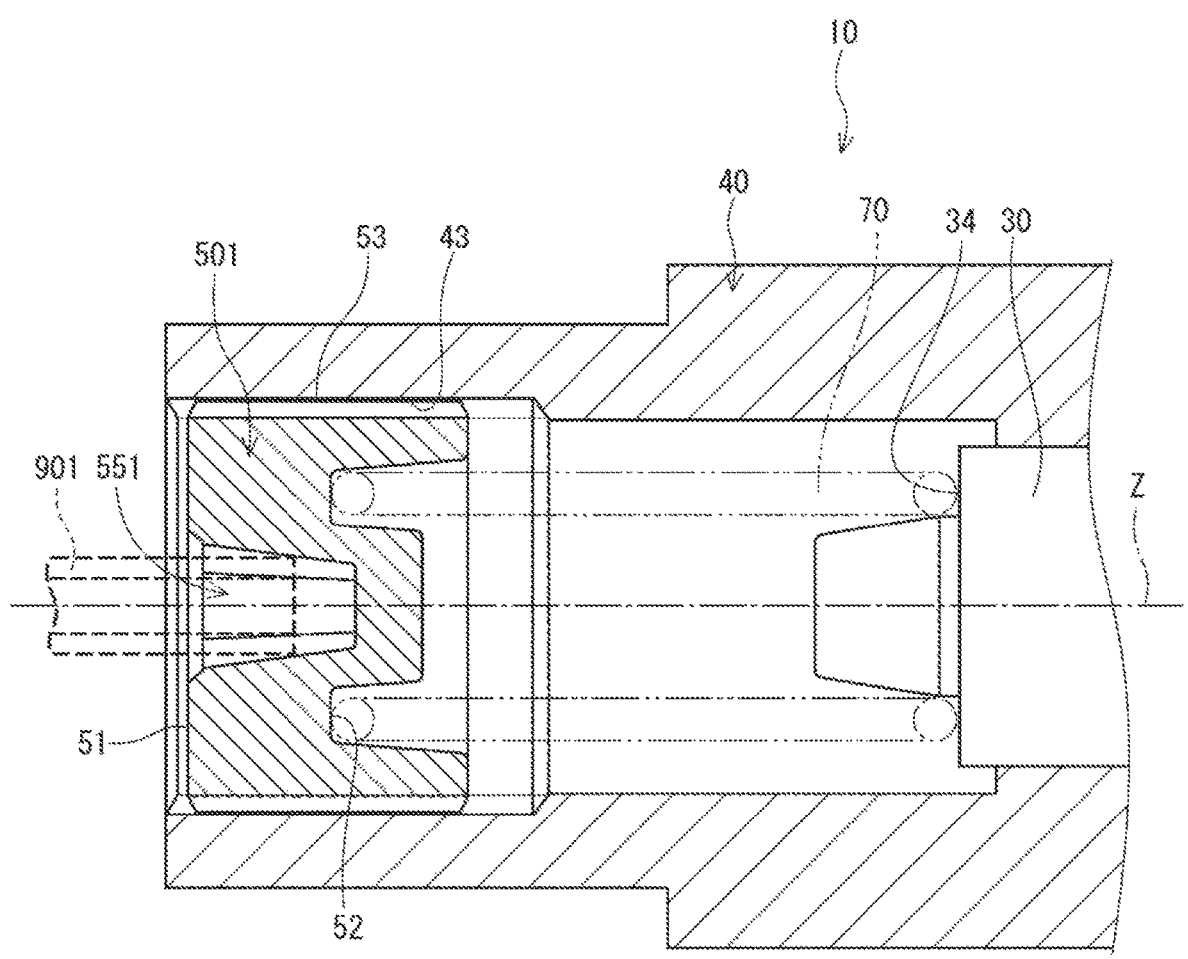
FIG. 2 is an enlarged view of a portion II of FIG. 1.
Figure 3:
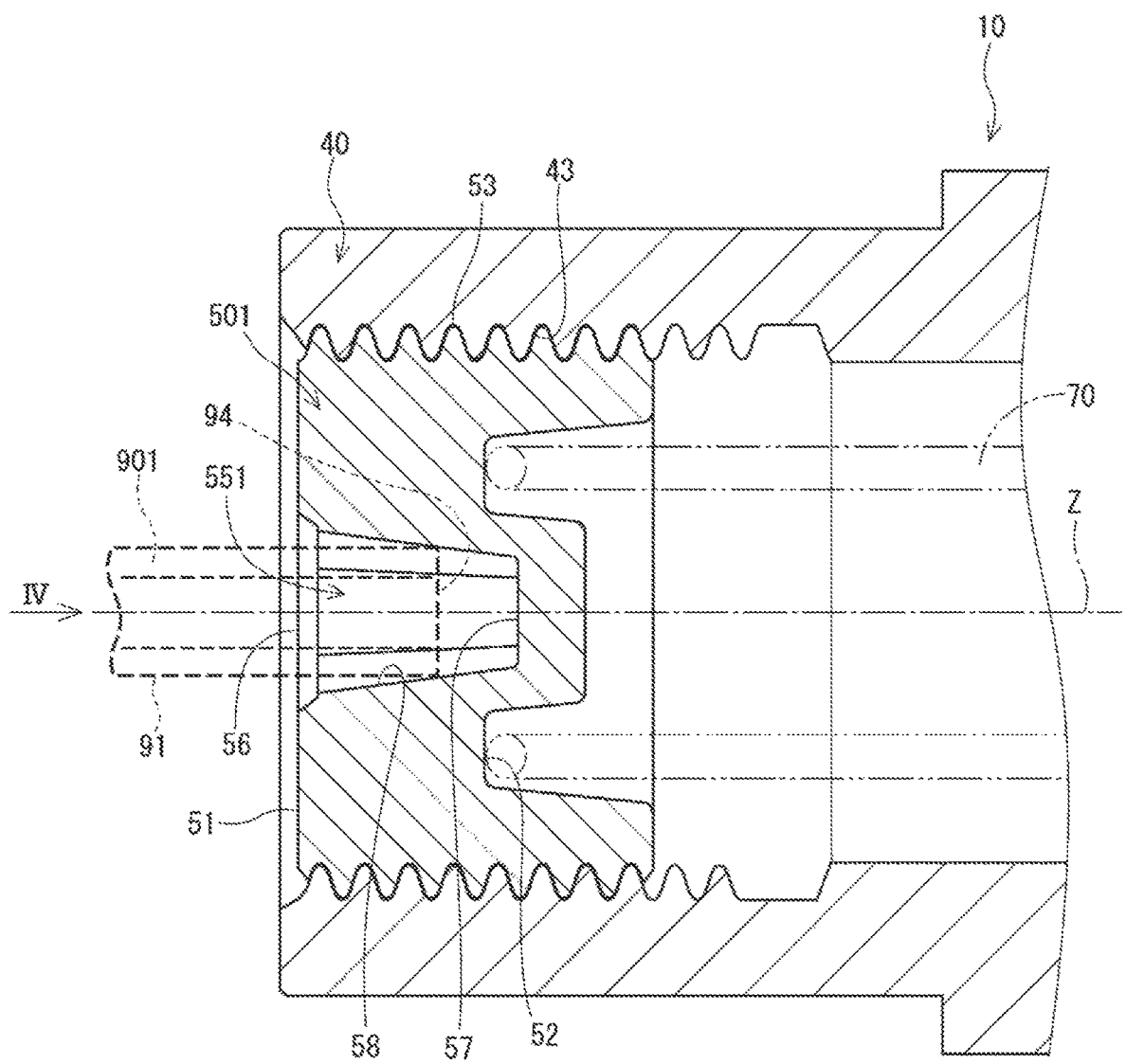
FIG. 3 is an enlarged cross-sectional view of a screw adjustment mechanism of an oil pressure control valve of a first embodiment.
Figure 4:
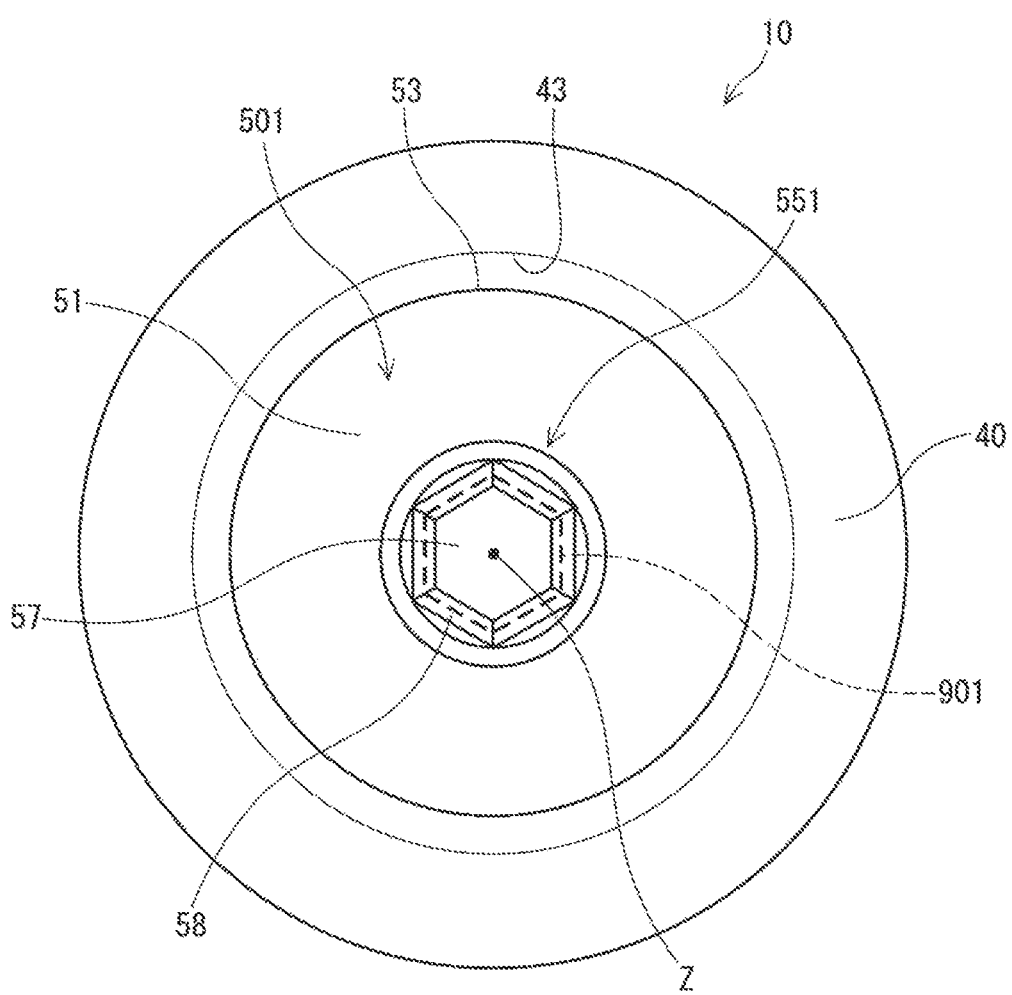
FIG. 4 is a view taken in a direction of an arrow IV in FIG. 3.

The structure of the screw adjustment mechanism of the first embodiment will be described with reference to FIGS. 3 and 4. FIG. 3 corresponds to a partial enlarged view of a front portion of FIG. 2. However, in FIGS. 1 and 2, the threaded portions 43, 53 are shown in a simple form according to the JIS drafting standards, whereas in FIG. 3, the threaded portions 43, 53 are respectively represented in a wavy shape according to a real structure thereof. When the adjustment screw 501 is rotated about the rotational axis Z, the adjustment screw 501 is displaced, i.e., is moved in the axial direction according to the rotation amount of the adjustment screw 501.

In the adjustment screw 501 of the first embodiment, a cross-section of the rotation transmitting portion 551 is shaped in a regular hexagon, and an inner wall 58 of the rotation transmitting portion 551 is sloped to progressively approach the rotational axis Z from an opening side, at which an opening 56 of the rotation transmitting portion 551 is placed, toward a bottom side, at which a bottom 57 of the rotation transmitting portion 551 is placed. Specifically, the rotation transmitting portion 551 is a hole that is shaped in a regular hexagonal frustum. Furthermore, the tool 901, which is used in the first embodiment, has an outer wall 91 that is shaped in a regular hexagonal column, which is parallel with the rotational axis Z. That is, the outer wall 91 of the tool 901 is shaped in a general straight form.

A cross-sectional size of a distal end 94 of the tool 901 is smaller than a cross-sectional size of the opening 56 of the rotation transmitting portion 551 and is larger than a cross-sectional size of the bottom 57 of the rotation transmitting portion 551. Therefore, when the tool 901 is inserted into the rotation transmitting portion 551 at a preparing stage of the pressure adjusting step described later, an outer periphery of the distal end 94 of the tool 901 contacts the inner wall 58 of the rotation transmitting portion 551. At this time, the tool 901 and the rotation transmitting portion 551 contact with each other without forming a gap therebetween regardless of the rotational direction of the tool 901.

A manufacturing method of the oil pressure control valve of the first embodiment will be described with reference to a flowchart of FIG. 5 and a time chart of FIG. 6. This manufacturing method of the oil pressure control valve includes the pressure adjusting step that includes rotating the adjustment screw 501 by the pressure adjusting device 80 and thereby adjusting the set load of the spring 70 to adjust the output oil pressure of the oil pressure control valve 10

(more specifically, for example, the output oil pressure of the oil which is outputted from the outlet port 422 and is sensed with the oil pressure sensor), which is generated under the predetermined drive condition of the drive device 20, to the target oil pressure P2. For other manufacturing steps, such as a processing step, an assembling step and an inspecting step of each component, a general manufacturing method may be used regardless of the details. It should be noted that FIGS. 5 and 6 are basically similarly applied in the second and third embodiments.

Figure 5:
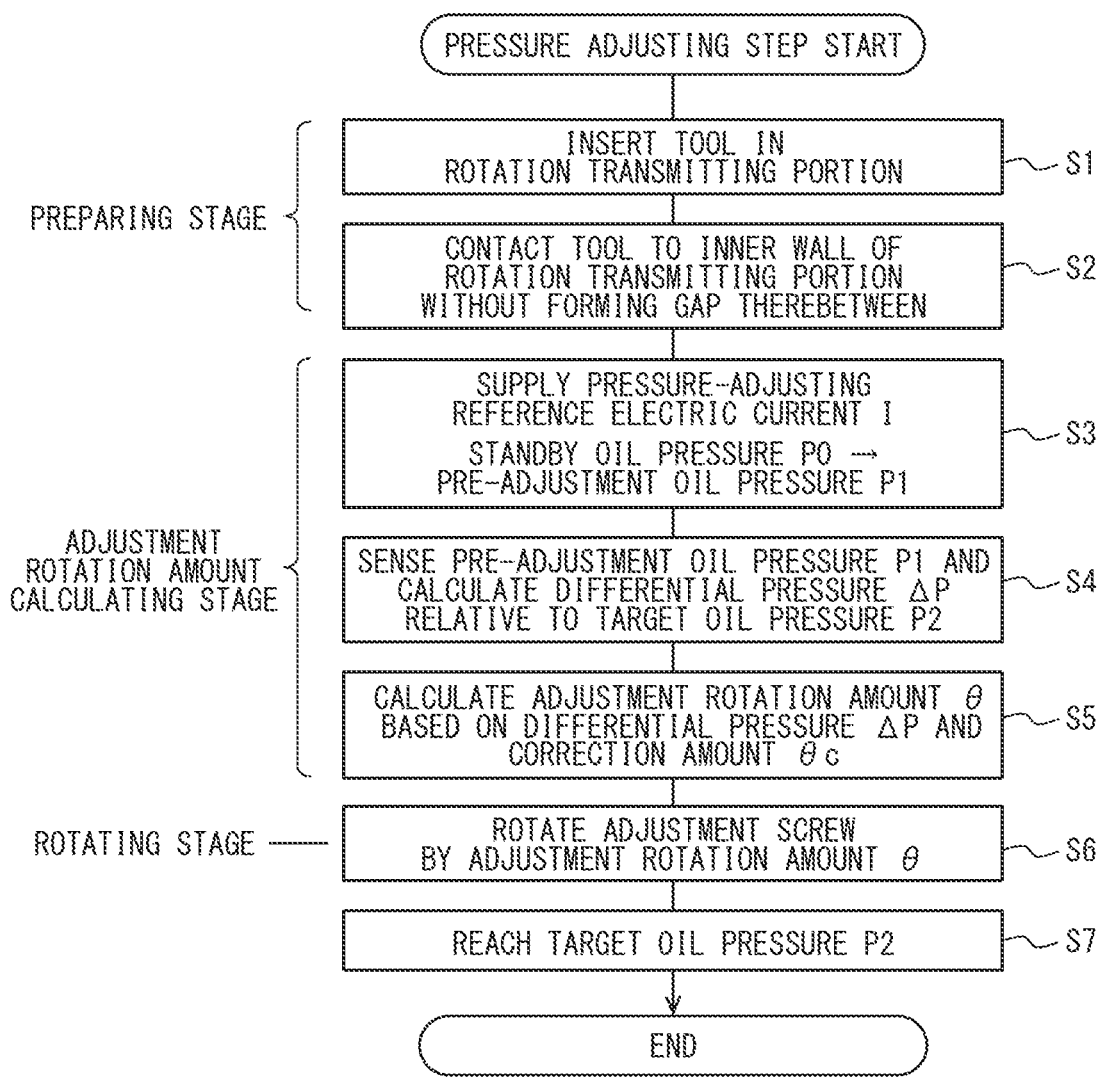
FIG. 5 is a flowchart of a pressure adjusting step of the first embodiment.

The flowchart of FIG. 5, which is executed by, for example, the processor of the pressure adjusting device 80, shows steps (sub-steps) accompanied with a letter S of the pressure adjusting step. The time chart of FIG. 6 indicates the input electric current of the drive device 20, the rotation amount of the adjustment screw 501 and the output oil pressure of the oil pressure control valve 10 at the pressure adjusting step. For the input electric current and the output oil pressure, a damped oscillation in the transition period is omitted, and the input electric current and the output oil pressure are respectively expressed as an average value. The pressure adjusting step includes a preparing stage, an adjustment rotation amount calculating stage and a rotating stage.

At an initial period of the pressure adjusting step, a standby electric current I0 is supplied as the input electric current, and a standby oil pressure P0 is outputted as the output oil pressure. At step S1 of the preparing stage, the pressure adjusting device 80 (more specifically, for example, the processor and the drive unit of the pressure adjusting device 80) inserts the tool 901 into the rotation transmitting portion 551 of the adjustment screw 501. Then, at step S2 of the preparing stage, the pressure adjusting device 80 (more specifically, for example, the processor and the drive unit of the pressure adjusting device 80) places the tool 901 in contact with the inner wall 58 of the rotation transmitting portion 551 such that a gap is eliminated between the tool 901 and the rotation transmitting portion 551. The tool 901 of the first embodiment is inserted to a depth, at which the outer periphery of the distal end 94 of the tool 901 of the first embodiment contacts the inner wall 58 of the rotation transmitting portion 551. The steps S1, S2 are executed at the time ta.

By the way, at the time of inserting the tool, which is shaped in the straight form, into the rotation transmitting portion, which is shaped in the straight form, it is necessary to provide a clearance to allow the insertion of the tool. Therefore, it is difficult to bring the tool and the rotation transmitting portion into contact with each other without forming the gap therebetween at the preparing stage. In contrast, according to the first embodiment, since the inner wall 58 of the rotation transmitting portion 551 is sloped, an error in the rotation amount of the adjustment screw 501 caused by the presence of the clearance can be eliminated by inserting the tool 901 to the depth, at which the outer periphery of the distal end 94 of the tool 901 contacts the inner wall 58 of the rotation transmitting portion 551.

Next, at step S3 of the adjustment rotation amount calculating stage, the pressure adjusting device 80 (more specifically, for example, the processor of the pressure adjusting device 80) changes the input electric current to a pressure adjustment reference electric current I at the time tb1. Specifically, when the pressure adjustment reference electric current I is supplied to the coil 24, the predetermined drive condition is set. In response to this, the output oil pressure is changed from the standby oil pressure P0 to a pre-adjustment oil pressure P1.

Next, at step S4, at the time tb2, the pressure adjusting device 80 (more specifically, for example, the oil pressure sensor and the processor of the pressure adjusting device 80) senses the pre-adjustment oil pressure P1, which is the output oil pressure at a pre-adjustment rotational position of the adjustment screw 501, and the pressure adjusting device 80 (more specifically, for example, the processor of the pressure adjusting device 80) calculates a differential pressure ΔP between the pre-adjustment oil pressure P1 and a target oil pressure P2. Then, at step S5, the pressure adjusting device 80 (more specifically, for example, the processor of the pressure adjusting device 80) calculates an adjustment rotation amount θ of the adjustment screw 501, which is required to rotate the adjustment screw 501 from the pre-adjustment rotational position to a target rotational position that corresponds to the target oil pressure P2, based on: the differential pressure ΔP; and a correction amount θc, which corresponds to a product characteristic of the oil pressure control valve. Here, the product characteristic, which is reflected in the correction amount θc, is, for example, a magnetic attractive force characteristic (or an electric current to solenoid generating load characteristic), and/or a spool position to output oil pressure characteristic.

Next, at a step S6 of the rotating stage, the pressure adjusting device 80 (more specifically, for example, the processor and the drive unit of the pressure adjusting device 80) rotates the adjustment screw 501 by the adjustment rotation amount θ as an adjusting operation at the time tc. Therefore, at step S7, the output oil pressure reaches the target oil pressure P2. The pressure adjusting step is completed by executing the above-described steps.

(Advantages)

(1) In the previously proposed pressure adjusting method, the pressure adjustment error is generated due to a change in the frictional force applied to the spool during the time of adjusting the pressure induced by the variation in the output oil pressure state before the adjustment and/or the variation among the individual products, i.e., the product-to-product variation. According to the present embodiment, the adjustment rotation amount θ is calculated in advance based on: the differential pressure ΔP between the pre-adjustment oil pressure P1 and the target oil pressure P2; and the correction amount θc, which corresponds to the product characteristic. By such feed-forward pressure adjustment, the output oil pressure can be adjusted with high accuracy without being affected by the variation in the frictional force applied to the spool 30.

(2) In the previously proposed pressure adjusting method, if the adjustment is performed while applying an axial load to the adjustment screw, a foreign object may be generated due to the friction between the male thread and the female thread. According to the present embodiment, since it is not required to apply the load to the adjustment screw 501 in the axial direction while rotating the adjustment screw 501, it is possible to limit the generation of the foreign object caused by the friction between the threaded portions 43, 53.

(3) In the first embodiment, the inner wall 58 of the rotation transmitting portion 551 of the adjustment screw 501 is sloped to progressively approach the rotational axis Z from the opening 56 side toward the bottom 57 side. At the preparing stage, the tool 901 is inserted to the depth, at which the outer periphery of the distal end 94 of the tool 901 contacts the inner wall 58 of the rotation transmitting portion 551. Therefore, an error in the rotation amount caused by the presence of the clearance is eliminated, and thereby accuracy of the adjustment rotation amount θ is ensured. It is also effective in shortening the adjustment time required in the mass production process.

(4) In the first embodiment, since the rotation transmitting portion 551 is the hole, which is shaped in the regular hexagonal frustum, the adjustment screw 501 is centered on the central axis of the tool 901. The adjustment accuracy is further improved by advancing the adjustment screw 501 in the axial direction in the state where the central axis of the male threaded portion 53 and the central axis of the female threaded portion 43 coincide with each other, and a valley and a crest of the male threaded portion 53 uniformly contact a crest and a valley, respectively, of the female threaded portion 43 all around the central axis.

Second Embodiment

The structure of the screw adjustment mechanism and the manufacturing method of the oil pressure control valve according to the second embodiment will be described with reference to FIGS. 7 and 8. The manufacturing method of the oil pressure control valve of the second embodiment further includes a fixing step that includes fixing the sleeve 40 and the adjustment screw 502 together after the pressure adjusting step. By executing the fixing step after the pressure adjusting step, it is possible to limit a change in the rotational position of the adjustment screw 502.

According to the previously proposed technique discussed above, after the adjustment of the spring load through the rotation of the adjustment screw, the male threaded portion of the sleeve and the female threaded portion of the adjustment screw are fixed together by plastically deforming the female threaded portion at two locations which are diametrically opposite to each other and are displaced from each other in the axial direction by a half pitch. However, in this method, there is a possibility that an adjustment error occurs due to the presence of the backlash of the threaded portions in the axial direction. Therefore, in the second embodiment, there is provided the method including the fixing step that can eliminate or minimize the influence of the backlash of threaded portions.

Figure 7:
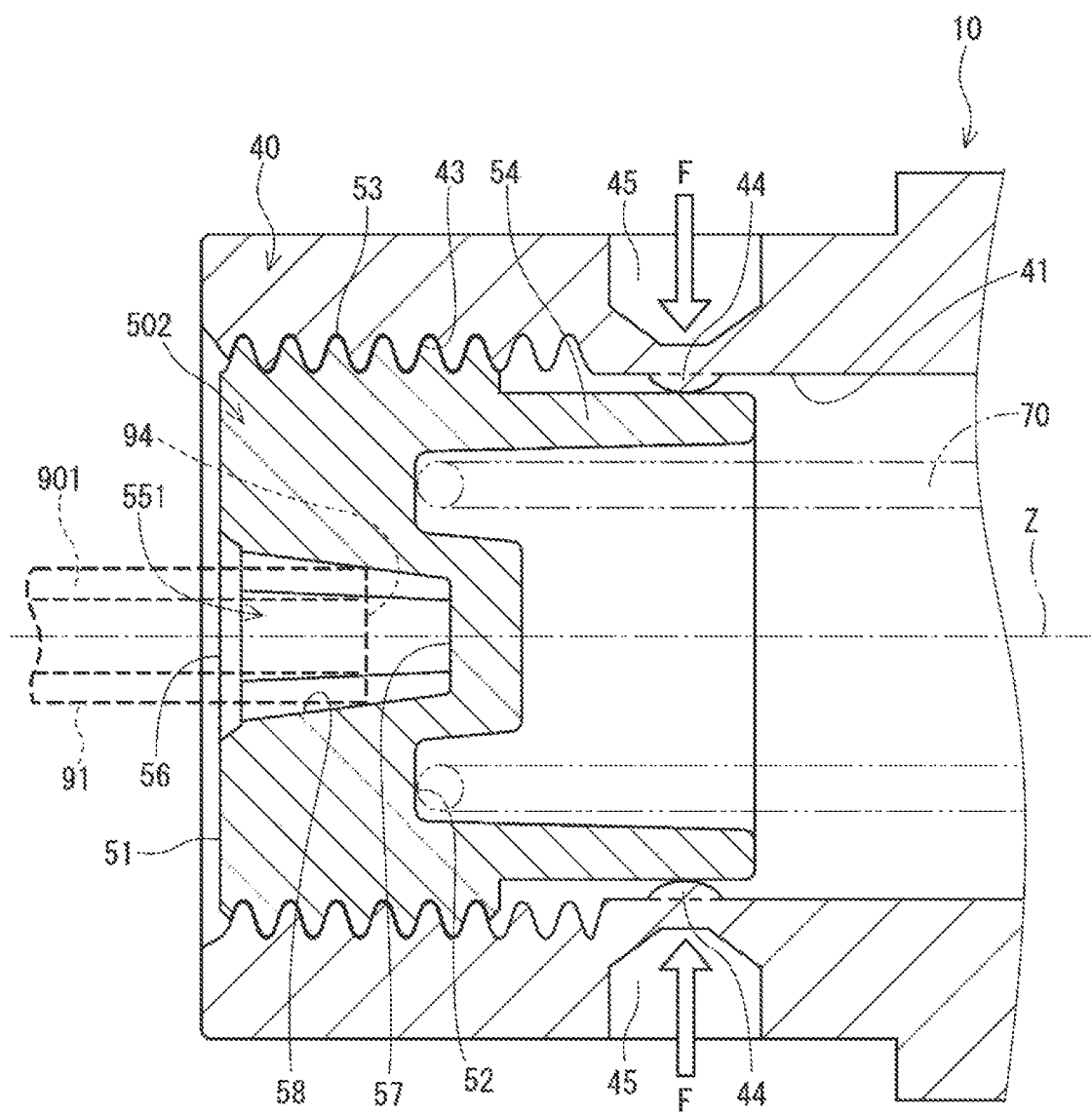
FIG. 7 is an enlarged cross-sectional view of a screw adjustment mechanism of an oil pressure control valve of a second embodiment.

As shown in FIG. 7, the adjustment screw 502 of the second embodiment differs from the adjustment screw 501 of the first embodiment with respect to the structure of an outer peripheral portion of the adjustment screw 502. The adjustment screw 502 has the male threaded portion 53 located at the end surface 51 side of the adjustment screw 502 in the axial direction. The adjustment screw 502 also has a non-threaded outer peripheral portion (i.e., an outer peripheral portion without a thread) 54, which is opposed to the inner wall 41 of the sleeve 40, on the spring 70 side of the adjustment screw 502 which is opposite to the end surface 51. Specifically, the adjustment screw 502 has the non-threaded outer peripheral portion 54 that is located at the axial position displaced from the male threaded portion 53.

The non-threaded outer peripheral portion 54 shown in FIG. 7 has an outer diameter that is generally constant and is smaller than a diameter of the valley of the male threaded portion 53. Furthermore, the axial length of the adjustment screw 502 is lengthened in comparison to the adjustment screw 501 of the first embodiment by the length of the non-threaded outer peripheral portion 54. The other remaining structure of the adjustment screw 502, such as the spring seat 52 and the rotation transmitting portion 551, is the same as that of the adjustment screw 501 of the first embodiment.

The sleeve 40 has a plurality of deformable portions 44 that are located at an axial position corresponding to the non-threaded outer peripheral portion 54 and are respectively placed at a plurality of circumferential locations, each of which is diametrically opposed to another one of the circumferential locations about the rotational axis Z. For example, each of the deformable portions 44 is formed by a thin wall portion which is radially located between a bottom of a corresponding recess 45 of the outer peripheral wall of the sleeve 40 and the inner wall 41 of the sleeve 40. The deformable portions 44 may be respectively arranged at, for example, two circumferential locations circumferentially arranged at 180 degree intervals about the rotational axis Z, or four circumferential locations circumferentially arranged at 90 degree intervals, or six circumferential locations circumferentially arranged at 60 degree intervals.

Each of the deformable portions 44 is locally plastically deformable by a load F applied in a radially inward direction. In FIG. 7, a broken straight line along the inner wall 41 of the sleeve 40 shows a shape before the plastic deformation of the deformable portion 44, and a solid arcuate line schematically shows a shape after the plastic deformation of the deformable portion 44. Before the time of applying the load F to each of the deformable portions 44 after the completion of the pressure adjusting step, there is a gap which is formed between the inner wall 41 of the sleeve 40 and the non-threaded outer peripheral portion 54 and is uniform in the circumferential direction. When the load F is applied to each of the deformable portions 44 in the radial direction, the deformable portion 44 is locally deformed in the radially inward direction and contacts the non-threaded outer peripheral portion 54.

Figure 8:
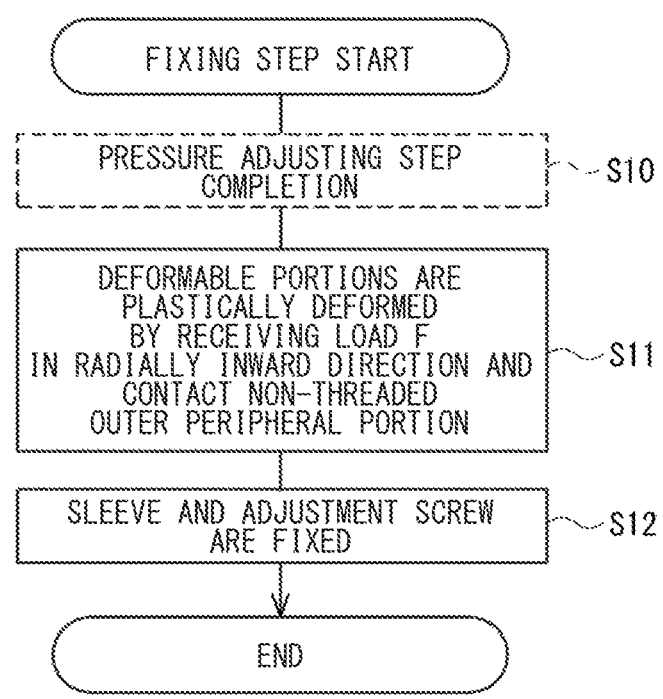
FIG. 8 is a flowchart of a fixing step of the second embodiment.

FIG. 8 shows the flowchart of the fixing step, which is executed by, for example, the processor of the pressure adjusting device 80, according to the second embodiment. After the completion of the pressure adjusting step at step S10, each of the deformable portions 44 is plastically deformed upon receiving the load F in the radially inward direction and contacts the non-threaded outer peripheral portion 54 at step S11. By this deformation and contact of each deformable portion 44, the sleeve 40 and the adjustment screw 502 are fixed together at step S12. That is, fixing by so-called "crimping" is carried out.

In the second embodiment, the deformable fixing portions are provided at the axial position which is displaced from the male threaded portion 53 of the adjustment screw 502, so that the sleeve 40 and the adjustment screw 502 can be appropriately fixed together while eliminating the influence of the backlash at the threaded portions of the previously proposed technique. Therefore, it is possible to limit a change in the rotational position of the adjustment screw 502, which is accurately adjusted at the pressure adjusting step, in response to a vibration(s) or an impact(s) applied after the pressure adjusting step.

Third Embodiment

Figure 9:
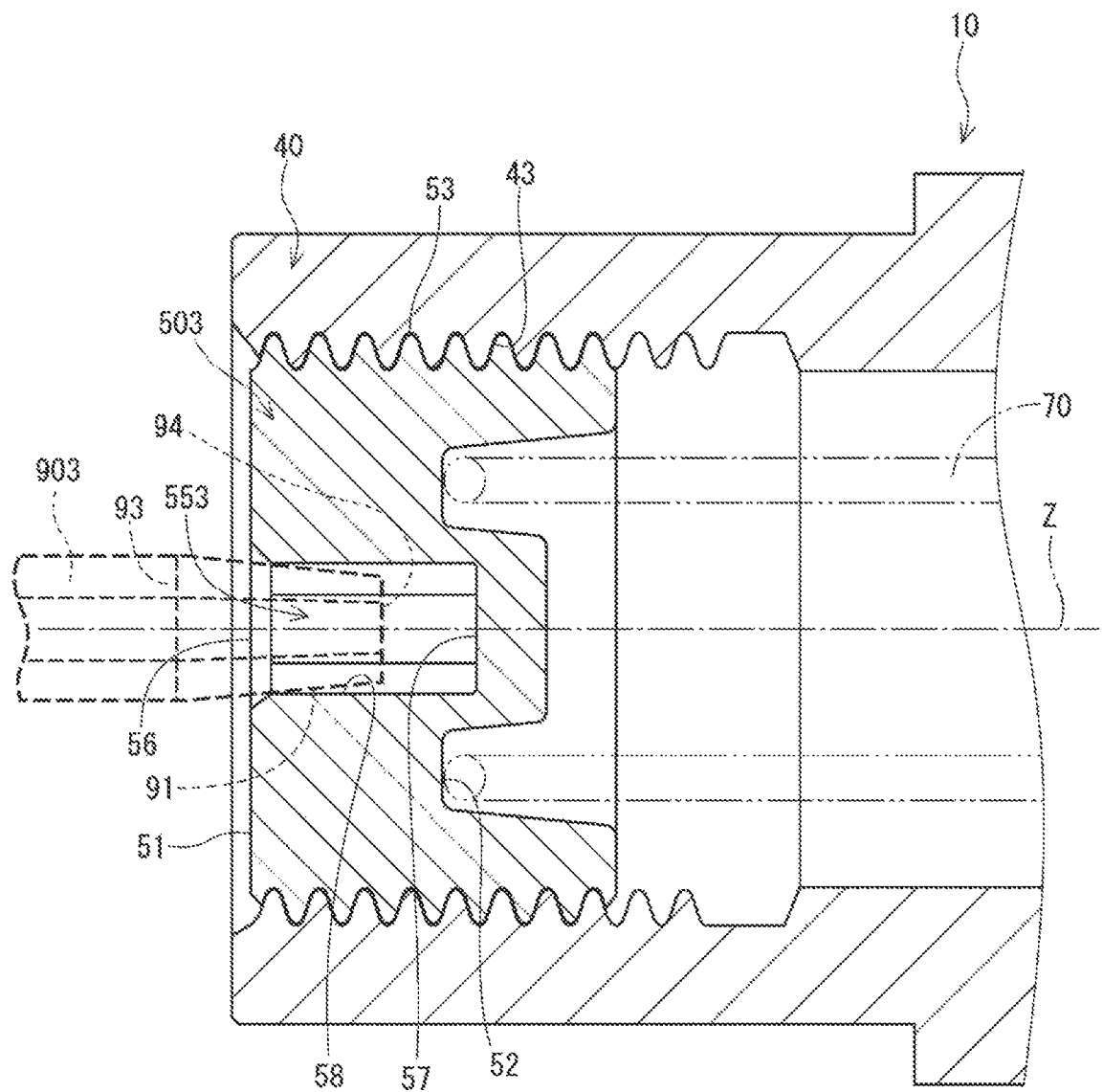
FIG. 9 is an enlarged cross-sectional view of a screw adjustment mechanism of an oil pressure control valve of a third embodiment.

The structure of the screw adjustment mechanism according to the third embodiment will be described with reference to FIG. 9. In the third embodiment, the shape of the rotation transmitting portion 553 of the adjustment screw 503 differs from the shape of the rotation transmitting portion 551 of the adjustment screw 501 of the first embodiment. The rotation transmitting portion 553 of the third embodiment has the cross-section shaped in the regular hexagon like the rotation transmitting portion 551 of the first embodiment. However, the inner wall 58 of the rotation transmitting portion 553 of the third embodiment is shaped in a straight form that extends in parallel with the rotational axis Z from the opening 56 side toward the bottom 57 side.

Furthermore, the tool 903 of the third embodiment has the cross-section shaped in the regular hexagon like the tool 901 of the first embodiment. However, the outer wall 91 of an inserting portion of the tool 903, which is inserted into the rotation transmitting portion 553, is sloped to progressively approach the rotational axis Z from a proximal end 93 of the inserting portion of the tool 903 to the distal end 94 of the tool 903. A cross-sectional size of the proximal end 93 of the tool 903 is larger than a cross-sectional size of the rotation transmitting portion 553, and a cross-sectional size of the distal end 94 of the tool 903 is smaller than the cross-sectional size of the rotation transmitting portion 553.

At the preparing stage of the pressure adjusting step, the tool 903 is inserted to a depth, at which an outer periphery of a sloped section of the outer wall 91 of the inserting portion of the tool 903 contacts the inner wall 58 of the rotation transmitting portion 553. The timing, at which the tool 903 contacts the rotation transmitting portion 553 without forming a gap therebetween, is the time to of FIG. 6. Thereafter, like in the first embodiment, the adjustment rotation amount calculating stage and the rotating stage are executed. Therefore, the advantages, which are the same as those of the first embodiment, are achieved.

As a modification of the third embodiment, the third embodiment and the first embodiment may be combined such that the outer wall 91 of the tool 903 and the inner wall 58 of the rotation transmitting portion 551 are sloped at equal angle. In this way, the outer wall 91 of the tool 903 and the inner wall 58 of the rotation transmitting portion 551 make a surface-to-surface contact therebetween, so that the rotation of the tool 903 is more accurately transmitted to the adjustment screw 501, and thereby the adjustment accuracy is improved.

Fourth Embodiment

The manufacturing method of the oil pressure control valve according to the fourth embodiment will be described with reference to FIGS. 10 and 11. In the fourth embodiment, the inner wall of the rotation transmitting portion of the adjustment screw and the outer wall of the tool are not sloped and are respectively shaped in a straight form. Specifically, the rotation transmitting portion 553 of the adjustment screw 503 of the third embodiment and the tool 901 of the first and second embodiments are combined.

Figure 6:
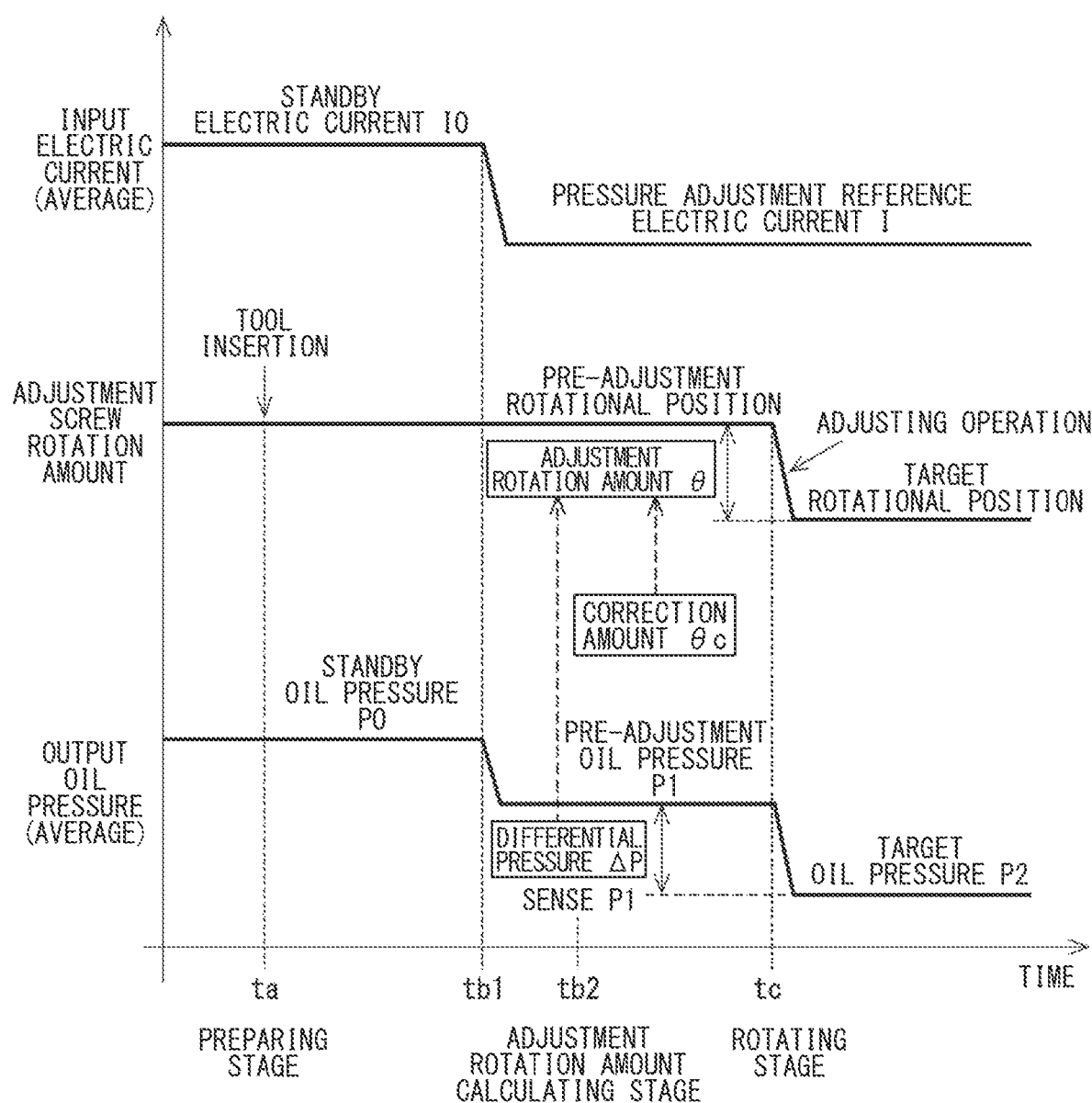
FIG. 6 is a time chart of the pressure adjusting step of the first embodiment.
Figure 10:
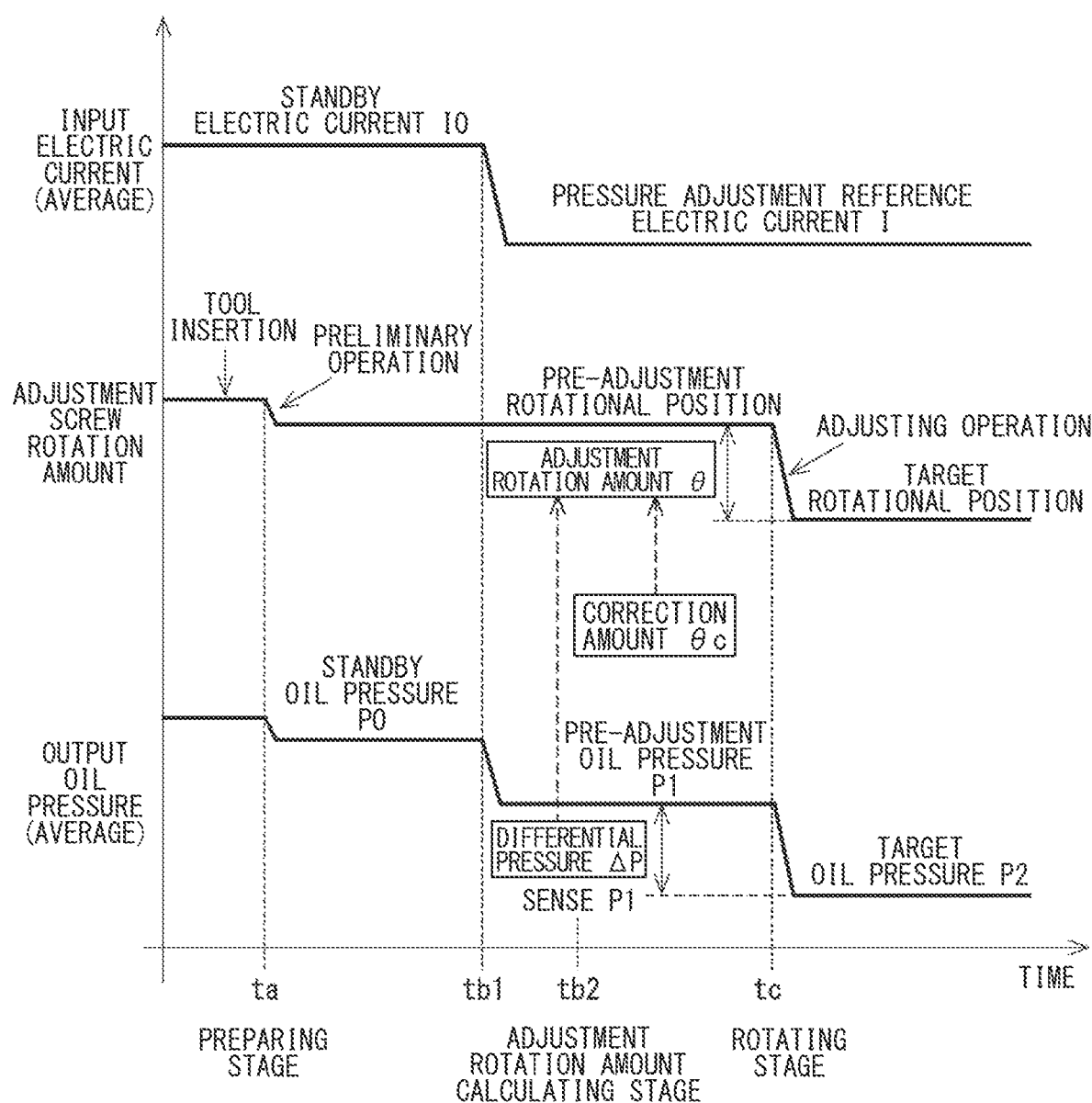
FIG. 10 is a time chart of the pressure adjusting step of a fourth embodiment.

FIG. 10 shows a time chart of the pressure adjusting step which corresponds to FIG. 6 of the first embodiment. The time chart of FIG. 10 is the same as the time chart of FIG. 6 except that as the preliminary operation at the time ta of the preparing stage, the adjustment screw 503 is rotated, and the output oil pressure is changed in response to the rotation of the adjustment screw 503. Here, particularly in the fourth embodiment, it is premised that the rotational direction of the tool 901 and the adjustment screw 503 in the pressure adjusting step is one direction. That is, the adjustment in a return direction, which is opposite to the one direction, is not performed.

Figure 11:
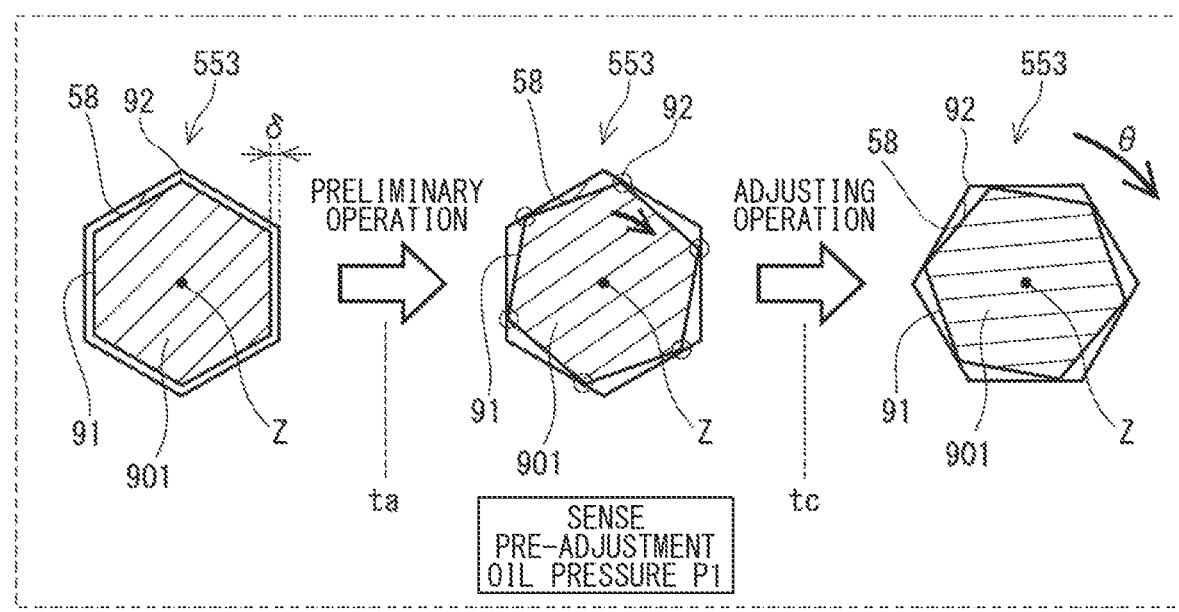
FIG. 11 is a diagram showing a change in a rotational position between a tool and a rotation transmitting portion in the pressure adjusting step of the fourth embodiment.

FIG. 11 shows a change in the rotational position of the tool 901 and a change in the rotational position of the rotation transmitting portion 553. FIG. 11 is a schematic view of the rotation transmitting portion 553 viewed from the proximal end side of the tool 901. At the time when the tool 901 is inserted into the rotation transmitting portion 553 before the time ta, on each of the six sides of the tool 901, a play $\delta$ exists between the outer wall 91 of the tool 901 and the inner wall 58 of the rotation transmitting portion 553. As the preliminary operation at the time ta, the tool 901 is rotated until each of six ridge lines 92 of the outer wall 91 contacts the inner wall 58 of the rotation transmitting portion 553. As a result of this preliminary operation, a gap between the tool 901 and the rotation transmitting portion 553 in the rotational direction of the tool 901 is eliminated. At this time, the output oil pressure is the standby oil pressure P0.

In this state, at the adjustment rotation amount calculating stage, after the supply of the pressure adjustment reference electric current I at the time tb1, the pre-adjustment oil pressure P1 is sensed at the time tb2, and the adjustment rotation amount θ is calculated based on: the differential pressure ΔP between the pre-adjustment oil pressure P1 and the target oil pressure P2; and the correction amount θc. Specifically, the adjustment rotation amount θ is calculated based on the pre-adjustment oil pressure P1 which is sensed in the state where the tool 901 and the rotation transmitting portion 553 contact with each without forming the gap in the rotational direction of the tool 901.

At the rotating stage, the tool 901 and the adjustment screw 503 are rotated together by the adjustment rotation amount θ at the rotating operation at the time tc, and the output oil pressure reaches the target oil pressure P2. Therefore, according to the fourth embodiment, the tool 901 shaped in the ordinary straight form and the adjustment screw 503 having the rotation transmitting portion 553 shaped in the straight form are used, and the advantages, which are the same as those of the above embodiments, are achieved.

Other Embodiments (1) FIGS. 12A to 12E show variations of the shape of the cross-section or the shape of the opening of the rotation transmitting portion of the adjustment screw other than the regular hexagon which is exemplified in the above embodiments. Like the rotation transmitting portion 551 of the first embodiment, there is depicted the form where the inner wall 58 of the rotation transmitting portion is sloped to progressively approach the rotational axis Z from the opening side to the bottom side. Here, it should be noted that the shape of these cross-sections may be applied to the rotation transmitting portion that has the straight form like the rotation transmitting portion 553 of the third embodiment.

Figure 12A:
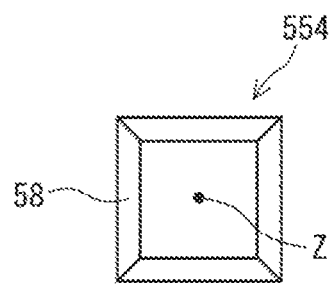
FIG. 12A is a diagram showing a shape of a cross-section (a shape of an opening) of a rotation transmitting portion of another embodiment.
Figure 12B:
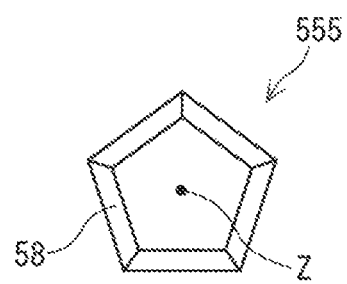
FIG. 12B is a diagram showing a shape of a cross-section (a shape of an opening) of a rotation transmitting portion of another embodiment.

The rotation transmitting portion 554 shown in FIG. 12A is a hole shaped in a regular quadrangular frustum, and the rotation transmitting portion 555 shown in FIG. 12B is a regular pentagonal frustum. The rotation transmitting portion 554 shown in FIG. 12A, the rotation transmitting portion 555 shown in FIG. 12B and the rotation transmitting portion 551 of the first embodiment are collectively referred to as "a hole that is shaped in a regular polygonal frustum while a radial cross-section of the hole is shaped in a regular polygon." Like the regular hexagonal frustum of the first embodiment, in the case where the rotation transmitting portion 554, 555 is the hole shaped in the regular polygonal frustum form, the adjustment screw is centered on the central axis of the tool. Therefore, the adjustment accuracy is further improved by advancing the adjustment screw in the axial direction in the state where the central axis of the male threaded portion 53 and the central axis of the female threaded portion 43 coincide with each other, and the valley and the crest of the male threaded portion 53 uniformly contact the crest and the valley, respectively, of the female threaded portion 43 all around the central axis.

Figure 12C:
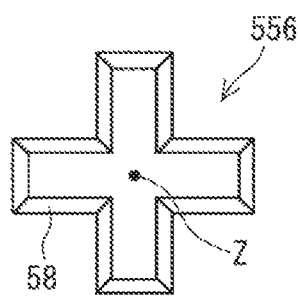
FIG. 12C is a diagram showing a shape of a cross-section (a shape of an opening) of a rotation transmitting portion of another embodiment.
Figure 12D:
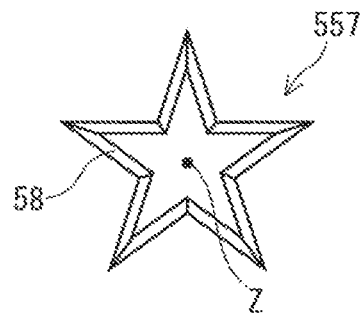
FIG. 12D is a diagram showing a shape of a cross-section (a shape of an opening) of a rotation transmitting portion of another embodiment.
Figure 12E:
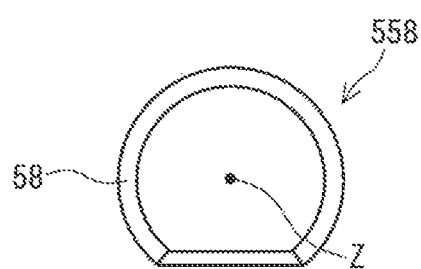
FIG. 12E is a diagram showing a shape of a cross-section (a shape of an opening) of a rotation transmitting portion of another embodiment.

The rotation transmitting portion 556 shown in FIG. 12C is a hole having a cross-section shaped in a cross-shape, and the rotation transmitting portion 557 shown in FIG. 12D is a hole having a cross-section shaped in a star-shape. The shapes shown in FIGS. 12A to 12D are rotationally symmetric with respect to the rotation axis Z. In contrast, the cross-section of the rotation transmitting portion 558 shown in FIG. 12E is shaped in a D-shape and is not rotationally symmetric. However, in a case where an angular extent of an arcuate portion of the D-shape of the cross-section of the rotation transmitting portion 558 is equal to or larger than 180 degrees, the centering function is ensured. As described above, the rotation transmitting portion may be the hole having the radial cross-section shaped in at least the non-circular shape, and the shape of the radial cross-section of the hole preferably has the centering function.

(2) The drive device 20 of the oil pressure control valve 10 is not limited to the one that generates the electromagnetic force as the drive force, and the drive device 20 may use any energy to move the spool 30.

(3) The shape, the arrangement and the number of the oil ports 42 of the sleeve 40 and the shape of the spool 30 of the oil pressure control valve 10 are not limited to those illustrated in FIG. 1. Further, the oil pressure control valve 10 is not limited to the one applied to the oil pressure system (hydraulic system) of the automatic transmission, and the oil pressure control valve 10 may be used for any purpose.

The present disclosure is not limited to the above-described embodiments and can be implemented in various forms without departing from the spirit of the present disclosure.

The present disclosure has been described in view of the embodiments. However, the present disclosure is not limited to such embodiments and structures. The present disclosure also includes various variations and variations within the equivalent range. Also, various combinations and forms, as well as other combinations and forms that include only one element, more, or less, are within the scope and ideology of the present disclosure.

The controllers and methods described in the present disclosure may be implemented by a special purpose computer created by configuring a processor programmed to execute one or more particular functions embodied in computer programs. Alternatively, the apparatuses and methods described in the present disclosure may be implemented by special purpose hardware logic circuits. Further alternatively, the apparatuses and methods described in the present disclosure may be implemented by a combination of one or more special purpose computers created by configuring a processor executing computer programs and one or more hardware logic circuits. The computer programs may be stored, as instructions being executed by a computer, in a tangible non-transitory computer-readable medium.

What is claimed is:

1. A manufacturing method for an oil pressure control valve that includes:
   a sleeve that is shaped in a tubular form and has a plurality of oil ports, each of which radially communicates between an inside and an outside of the sleeve, wherein a female threaded portion is formed at one end portion of the sleeve;
   a spool that is received in the sleeve and is configured to slide along an inner wall of the sleeve, wherein the spool opens or closes a corresponding one or more of the plurality of oil ports depending on an axial position of the spool to change an output oil pressure of the oil pressure control valve;
   a drive device that is configured to generate a drive force for moving the spool toward the female threaded portion;
   a spring that is configured to urge the spool in a direction away from the female threaded portion against the drive force; and
   an adjustment screw that includes:
      a male threaded portion that is threadably engaged with the female threaded portion of the sleeve; and
      a rotation transmitting portion that is a hole which opens at an end surface of the adjustment screw and has a radial cross-section shaped in a non-circular form such that a tool, which has a radial cross-section shaped in a form that corresponds to the non-circular form of the radial cross-section of the rotation transmitting portion, is insertable into the rotation transmitting portion, wherein the adjustment screw is configured to adjust a set load of the spring when the adjustment screw is rotated integrally with the tool inserted into the rotation transmitting portion to change a position of the adjustment screw in an axial direction according to a rotation amount of the adjustment screw, the manufacturing method comprising:
   a pressure adjusting step that includes rotating the adjustment screw by a pressure adjusting device and thereby adjusting the set load of the spring to adjust the output oil pressure of the oil pressure control valve, which is generated under a predetermined drive condition of the drive device, to a target oil pressure, wherein the pressure adjusting step includes:
   a preparing stage that includes placing the tool in contact with an inner wall of the rotation transmitting portion by the pressure adjusting device without forming a gap between the tool and the rotation transmitting portion at least in a rotational direction of the tool;
   an adjustment rotation amount calculating stage that includes:
      sensing a pre-adjustment oil pressure, which is the output oil pressure at a pre-adjustment rotational position of the adjustment screw under the predetermined drive condition, by the pressure adjusting device after the preparing stage; and
      thereafter calculating an adjustment rotation amount of the adjustment screw by the pressure adjusting device from the pre-adjustment rotational position of the adjustment screw to a target rotational position of the adjustment screw, which corresponds to the target oil pressure, based on:
         a differential pressure between the pre-adjustment oil pressure and the target oil pressure; and
         a correction amount which corresponds to a product characteristic of the oil pressure control valve; and
   a rotating stage that includes rotating the adjustment screw by the adjustment rotation amount by the pressure adjusting device.

2. The manufacturing method of claim 1, wherein:
   the rotation transmitting portion of the adjustment screw is shaped such that the inner wall of the rotation transmitting portion is sloped to progressively approach a rotational axis of the adjustment screw from an opening side, at which an opening of the rotation transmitting portion is placed, toward a bottom side, at which a bottom of the rotation transmitting portion is placed; and the preparing stage includes inserting the tool to a depth at which an outer periphery of a distal end of the tool contacts the inner wall of the rotation transmitting portion.

3. The manufacturing method according to claim 2, wherein the rotation transmitting portion is the hole that is shaped in a regular polygonal frustum while a radial cross-section of the hole is shaped in a regular polygon, and a cross-sectional size of the hole progressively decreases from the opening side toward the bottom side.

4. The manufacturing method according to claim 1, wherein:
the adjustment screw has a non-threaded outer peripheral portion that is opposed to the inner wall of the sleeve and is located at an axial position that is displaced from the male threaded portion;
the sleeve has a plurality of deformable portions that are located at an axial position corresponding to the non-threaded outer peripheral portion and are respectively placed at a plurality of circumferential locations, each of which is diametrically opposed to another one of the plurality of circumferential locations about a rotational axis of the adjustment screw, wherein each of the plurality of deformable portions is locally plastically deformable by a load applied in a radially inward direction; and
the manufacturing method further comprises a fixing step that includes fixing the sleeve and the adjustment screw together after the pressure adjusting step by plastically deforming the plurality of deformable portions through application of the load to each of the plurality of deformable portions in the radially inward direction such that the plurality of deformable portions contact the non-threaded outer peripheral portion.

5. The manufacturing method according to claim 1, wherein:
an outer wall of an inserting portion of the tool, which is configured to be inserted into the rotation transmitting portion, is sloped to progressively approach a rotational axis of the adjustment screw from a proximal end side, at which a proximal end of the inserting portion of the tool is placed, toward a distal end side, at which a distal end of the tool is placed; and
the preparing stage includes inserting the tool to a depth, at which an outer periphery of a sloped section of the outer wall of the inserting portion of the tool contacts the inner wall of the rotation transmitting portion.

6. The manufacturing method according to claim 1, wherein:
the drive device is configured to generate an electromagnetic force as the drive force through supply of an electric current to a coil of the drive device; and
the predetermined drive condition is set when a pressure-adjusting reference electric current is supplied to the coil.

\* \* \* \* \*